United States Patent
Fahrner et al.

(10) Patent No.: US 10,780,984 B2
(45) Date of Patent: Sep. 22, 2020

(54) SEWN REINFORCEMENT FEATURES FOR PREVENTION OF STITCH BREAKAGE IN A PNEUMATIC DE-ICER

(71) Applicant: Goodrich Corporation, Charlotte, NC (US)

(72) Inventors: Alan J. Fahrner, Canton, OH (US); Andrew Taylor, Hudson, OH (US); James Putt, Doylestown, OH (US)

(73) Assignee: Goodrich Corporation, Charlotte, NC (US)

( * ) Notice: Subject to any disclaimer, the term of this patent is extended or adjusted under 35 U.S.C. 154(b) by 422 days.

(21) Appl. No.: 15/903,656

(22) Filed: Feb. 23, 2018

(65) Prior Publication Data

US 2018/0305031 A1    Oct. 25, 2018

Related U.S. Application Data

(60) Provisional application No. 62/487,830, filed on Apr. 20, 2017.

(51) Int. Cl.
*B64D 15/16* (2006.01)
*D05B 93/00* (2006.01)

(52) U.S. Cl.
CPC ........... *B64D 15/166* (2013.01); *B64D 15/16* (2013.01); *D05B 93/00* (2013.01)

(58) Field of Classification Search
CPC .............. B64D 15/166; B64D 15/163; B64D 15/00–22; D05B 93/00; D05B 1/18; D05B 13/00
See application file for complete search history.

(56) References Cited

U.S. PATENT DOCUMENTS

| 2,079,569 A | * | 5/1937 | Christensen | ........... | D05B 93/00 |
| | | | | | 112/475.01 |
| 2,406,528 A | * | 8/1946 | Blair | ................. | A41F 1/04 |
| | | | | | 450/141 |

(Continued)

FOREIGN PATENT DOCUMENTS

GB    2167723 A    6/1986

OTHER PUBLICATIONS

Extended European Search Report for EP Application No. 18168610.6, dated Sep. 18, 2018, 6 pages.

*Primary Examiner* — Ismael Izaguirre
(74) *Attorney, Agent, or Firm* — Kinny & Lange, P.A.

(57) ABSTRACT

A de-icing assembly for a surface of an aircraft includes a carcass, seams, inflation passages, a manifold, and a reinforcement stitchline. The carcass includes a first layer, a second layer, and a carcass centerline. The seams are sewn into the carcass and join the first and second layers of the carcass together. The inflation passages are formed by the seams and are disposed between the first and second layers of the carcass. The manifold includes a width and a manifold centerline oriented approximately perpendicular to the carcass centerline and is fluidly connected to and is disposed beneath the carcass. The first reinforcement stitchline is sewn into the carcass adjacent to one of the plurality of seams and is disposed at a location on the carcass overlapping with the manifold. The first reinforcement stitchline is disposed approximately perpendicular to the manifold centerline and extends across the width of the manifold.

14 Claims, 4 Drawing Sheets

(56) References Cited

U.S. PATENT DOCUMENTS

| | | | | |
|---|---|---|---|---|
| 4,613,102 | A | * | 9/1986 | Kageorge ............ B64D 15/166 |
| | | | | 244/134 A |
| 4,961,549 | A | * | 10/1990 | LaRue ................ B64D 15/166 |
| | | | | 244/134 A |
| 5,112,011 | A | | 5/1992 | Weisend, Jr. et al. |
| 5,310,142 | A | | 5/1994 | Weisend, Jr. |
| 5,337,978 | A | | 8/1994 | Fahrner et al. |
| 5,449,134 | A | * | 9/1995 | Weisend, Jr. ........... B29C 65/76 |
| | | | | 244/121 |
| 5,558,304 | A | | 9/1996 | Adams |
| 6,247,669 | B1 | * | 6/2001 | Rauckhorst, III ... B64D 15/166 |
| | | | | 244/134 A |
| 6,520,452 | B1 | | 2/2003 | Crist et al. |

* cited by examiner

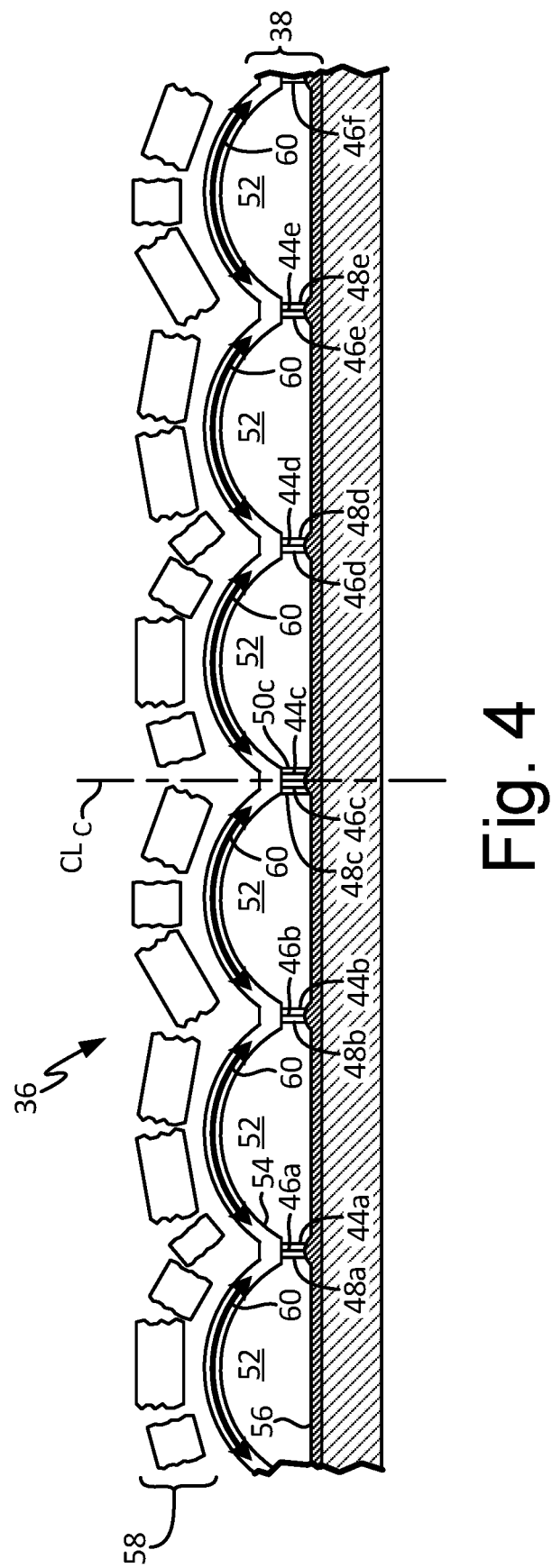

SEWN REINFORCEMENT FEATURES FOR PREVENTION OF STITCH BREAKAGE IN A PNEUMATIC DE-ICER

CROSS-REFERENCE TO RELATED APPLICATION(S)

This application claims the benefit of U.S. Provisional Application No. 62/487,830 filed Apr. 20, 2017 for "SEWN REINFORCEMENT FEATURES FOR PREVENTION OF STITCH BREAKAGE IN A PNEUMATIC DE-ICER" by A. Fahrner, A. Taylor and J. Putt.

BACKGROUND

The present invention relates generally to ice protection systems, and more specifically to pneumatic de-icing systems for aircraft.

During operation, aircraft face an undesirable risk of ice accretion on forward facing components such as the leading edge of wings, horizontal stabilizers, or other airfoils. Ice that forms on airfoil components can cause drag, loss of lift, and added weight. In order to avoid such problems, it is desired to provide an ice protection system that reduces ice formation on airfoil surfaces while also maintaining relatively low power expenditures by the ice protection system. One such ice protection system is a pneumatic de-icer.

Existing pneumatic de-icers (sometimes called de-icer boots) employ inflation tubes created between an inner layer and an outer layer of the de-icer. The inflation tubes inflate causing portions of the outer layers to move away from the aircraft structure. This movement deforms the outer layer so that ice that has accumulated on the outer layer cracks and is shed from the outer layer.

Pneumatic de-icers on airfoil leading edges horizontal stabilizers of some aircraft are subjected to a high utilization (e.g., inflation/deflation cycle) rate due to system operational designs of multiple inflations per de-icing cycle, as well as increased system utilization mandated for aircraft by aviation authorities due to severe icing events. This increased utilization of the pneumatic ice protection system results in increased fatigue of the de-icers. In some cases, at the horizontal stabilizer location, the increased fatigue results in internal stitchline breakage followed by tearing of the surface plies of the material of the de-icer. In some cases, these tears become a scoop due to the flow of air over the horizontal stabilizer surface. This scoop affects flight quality on aircraft and can become a safety concern.

SUMMARY

A de-icing assembly for a surface of an aircraft includes a carcass, seams, inflation passages, a manifold, and a reinforcement stitchline. The carcass includes a first layer, a second layer, and a carcass centerline. The seams are sewn into the carcass and join the first and second layers of the carcass together. The inflation passages are formed by the seams and are disposed between the first and second layers of the carcass. The manifold includes a width and a manifold centerline oriented approximately perpendicular to the carcass centerline and is fluidly connected to and is disposed beneath the carcass. The first reinforcement stitchline is sewn into the carcass adjacent to one of the plurality of seams and is disposed at a location on the carcass overlapping with the manifold. The first reinforcement stitchline is disposed approximately perpendicular to the manifold centerline and extends across the width of the manifold.

An aircraft includes an airfoil with a surface and a de-icing assembly mounted to the surface of the airfoil. The de-icing assembly includes a carcass, seams, inflation passages, a manifold, a first reinforcement stitchline, and a second reinforcement stitchline. The carcass includes a first layer, a second layer, and a carcass centerline. The seams are sewn into the carcass and join the first and second layers of the carcass together. The inflation passages are formed by the seams and are disposed between the first and second layers of the carcass. The manifold includes a width and a manifold centerline oriented approximately perpendicular to the carcass centerline and is fluidly connected to and is disposed beneath the carcass. The first reinforcement stitchline is sewn into the carcass adjacent to one of the plurality of seams and is disposed at a location on the carcass overlapping with the manifold. The first reinforcement stitchline is disposed approximately perpendicular to the manifold centerline and extends across the width of the manifold.

BRIEF DESCRIPTION OF THE DRAWINGS

FIG. 4 is a cross-section view taken along 4-4 in FIG. 2 of the pneumatic de-icer in a distended (inflated) condition.

DETAILED DESCRIPTION

Figure 1:
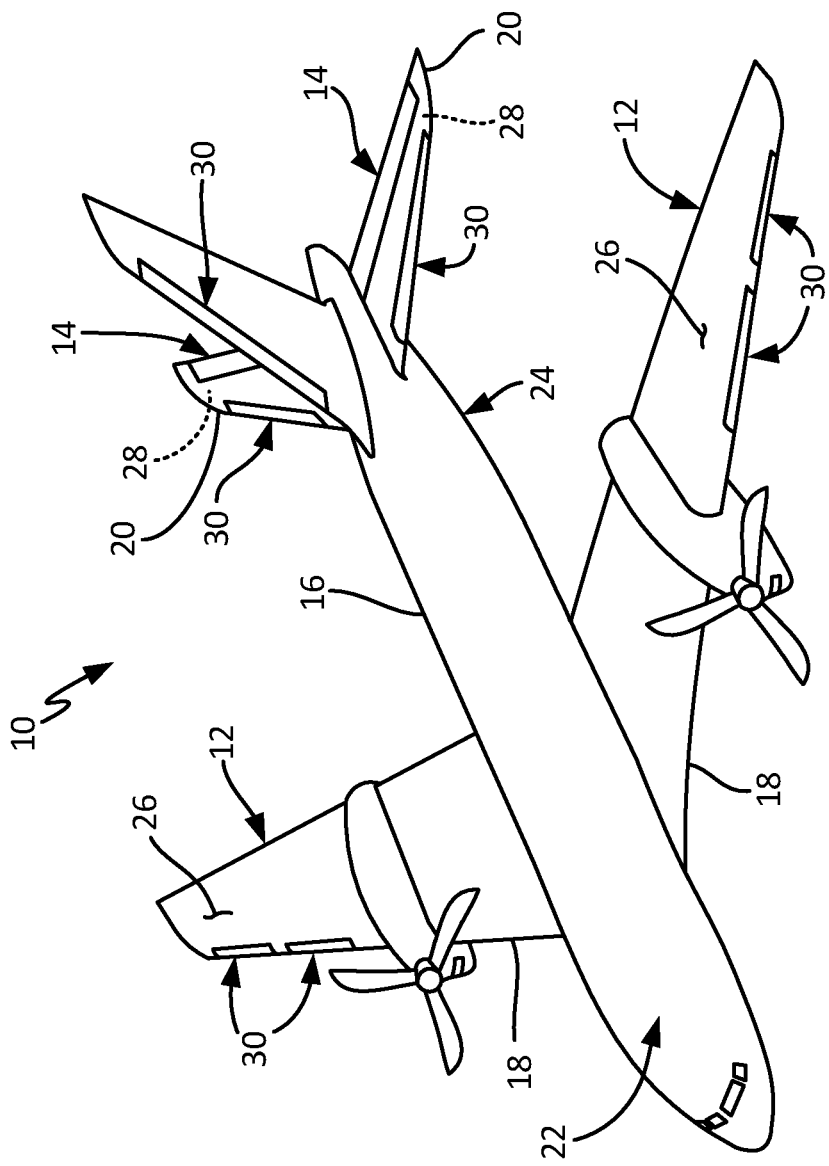
FIG. 1 is a perspective view of an aircraft with a pneumatic de-icing assembly.

FIG. 1 is a perspective view of aircraft 10 including wings 12, horizontal stabilizers 14, and fuselage 16. Wings 12 include leading edges 18 and horizontal stabilizers 14 include leading edges 20. In the illustrated configuration of FIG. 1, aircraft 10 is of a fixed-wing design. Fuselage 16 extends from nose section 22 to tail section 24, with wings 12 fixed to fuselage 16 between nose section 22 and tail section 24. Horizontal stabilizers 14 are attached to fuselage 16 on tail section 24. Wings 12 and horizontal stabilizers 14 function to create lift and to prevent pitching, respectively, for aircraft 10. Wings 12 and horizontal stabilizers 14 include critical suction surfaces, such as upper surfaces 26 of wings 12 and lower surfaces 28 of horizontal stabilizers 14, where flow separation and loss of lift can occur if icing conditions form on any of the surfaces of wings 12 and horizontal stabilizers 14. FIG. 1 also shows de-icing assemblies 30 mounted onto leading edges 18 of wings 12 and onto leading edges 20 of horizontal stabilizers 14. In other non-limiting embodiments, de-icing assemblies 30 can be mounted onto any leading edge or non-leading edge surface of aircraft 10. De-icing assemblies 30 function by filling with air to deform an outward surface of de-icing assemblies 30 so as to break apart ice formed on horizontal stabilizers.

Figure 2:
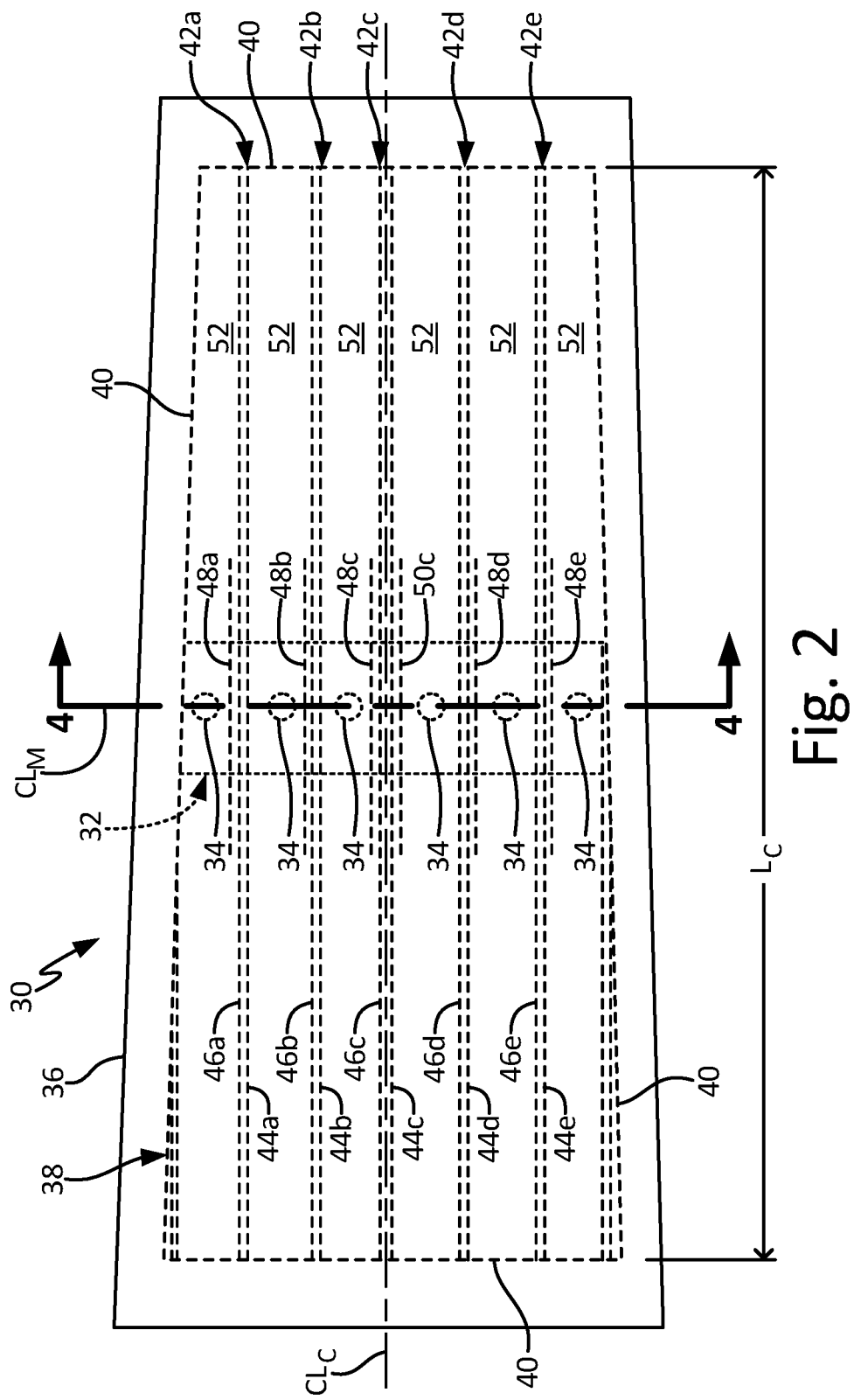
FIG. 2 is a top view of the pneumatic de-icing assembly with a pneumatic de-icer.
Figure 3:
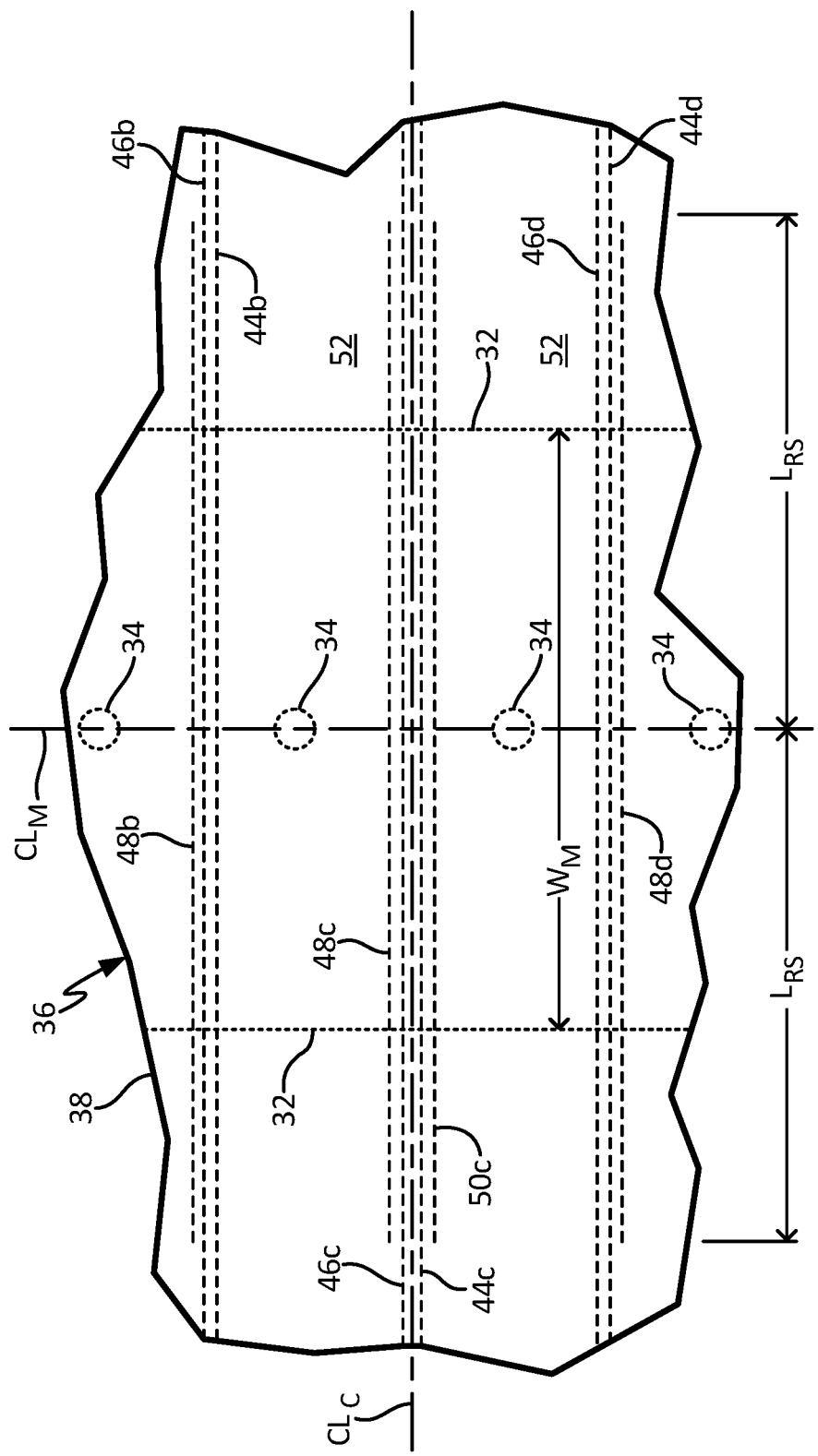
FIG. 3 is a cut-out detail view of the pneumatic de-icing assembly and a manifold.

FIG. 2 shows a top view of de-icing assembly 30 with manifold 32 (including air connection holes 34 and manifold centerline $CL_M$) and de-icer 36 (including carcass 38 with boundary 40, carcass centerline $CL_C$, seams 42a-42e, first stitchlines 44a-44e, second stitchlines 46a-46e, first reinforcement stitchlines 48a-48e, second reinforcement stitchline 50c, and inflation passages 52). FIG. 2 also shows length $L_C$ of carcass 38. FIG. 3 is a cut-out detail view of de-icing assembly 30 and manifold 32. FIG. 3 also shows width $W_M$ of manifold 32 and length $L_{RS}$ of first reinforcement stitchlines 48b-48d and second reinforcement stitchline 50c. FIGS. 2 and 3 show substantially similar views, and will be discussed in unison.

De-icing assembly 30 is an assembly of components configured to remove ice formed on de-icing assembly 30. Manifold 32 is a conduit for the transmission of a fluid such as a gas. Air connection holes 34 are orifices configured to allow passage of a fluid such as a gas. Width $W_M$ is a width of manifold 32 measured from left to right in FIGS. 2 and 3. In one non-limiting embodiment, width $W_M$ can be approximately 6 inches (15.24 centimeters). Manifold centerline $CL_M$ is an imaginary line passing through a center of manifold 32. De-icer 36 is an element configured to remove ice formed on de-icing assembly 30. In one non-limiting embodiment, de-icer 36 can include a pneumatic de-icer. Carcass 38 is a flexible, layered article configured to retain a volume of pressurized gas. Boundaries 40 are edges or borders of carcass 38. Carcass centerline $CL_C$ is an imaginary line passing through a center of carcass 38.

Seams 42a-42e are lines along which layers of carcass 38 are joined and/or attached together. In one non-limiting embodiment, any of seams 42a-42e can include one or more stitchlines. First stitchlines 44a-44e, second stitchlines 46a-46e, first reinforcement stitchlines 48a-48e, and second reinforcement stitchline 50c are loops of thread. In one non-limiting embodiment, a material of first stitchlines 44a-44e, second stitchlines 46a-46e, first reinforcement stitchlines 48a-48e, and/or second reinforcement stitchline 50c can include para-aramid synthetic fiber, aramid polymer, aliphatic polyamide, semi-aromatic polyamide, or another type of synthetic polymer or polyamide. Inflation passages 52 are inflatable tubes or channels. In one non-limiting embodiment, passages 52 can include a width (measured from top to bottom in FIGS. 2 and 3) of 1 inch (2.54 centimeters) between adjacent seams 42a-42e. In another non-limiting embodiment, passages 52 on either side of carcass centerline $CL_C$ can include a width of 1.25 inches (3.175 centimeters). Length $L_C$ is a length of carcass 38 (measured from left to right in FIGS. 2 and 3).

De-icing assembly 30 is attached to or mounted to a surface of aircraft 10 such as one or both of horizontal stabilizers 14 (as shown in FIG. 1). Manifold 32 is fluidly connected to de-icer 36 and is disposed beneath carcass 38. Air connection holes 34 are fluidly connected to inflation passages 52 of carcass 38 and to an air supply (not shown) located on aircraft 10. Manifold centerline $CL_M$ extends longitudinally across manifold 32 and approximately bi-sects manifold 32 into halves approximately of equal size. Manifold centerline $CL_M$ is oriented approximately perpendicular to carcass centerline $CL_C$. De-icer 36 is fluidly connected to manifold 32. Carcass 38 is disposed above and fluidly connected to manifold 32. Boundaries 40 extend around a perimeter of carcass 38. Carcass centerline $CL_C$ extends longitudinally across (from left to right in FIGS. 2 and 3) carcass 38 and approximately bi-sects carcass 38 into two sections sized as necessary for the particular airfoil.

Seams 42a-42e extend longitudinally across carcass 38. Seams 42a-42e form channels 52 between consecutive seams 42a-42e. First stitchlines 44a-44e, second stitchlines 46a-46e, first reinforcement stitchlines 48a-48e, and second reinforcement stitchline 50c are sewn (e.g., stitched) into and through the layers of carcass 38 to attach the layers of carcass 38 together. In some non-limiting embodiments, first reinforcement stitchlines 44a-44e can be disposed on an opposite side of respective seams 42a-42e from carcass centerline $CL_C$. In other non-limiting embodiments, first reinforcement stitchlines 44a-44e can be disposed on a same side of respective seams 42a-42e as carcass centerline $CL_C$.

In some non-limiting embodiments, second stitchlines 46a-46e can be disposed on an opposite side of respective seams 42a-42e from carcass centerline $CL_C$. In other non-limiting embodiments, second stitchlines 46a-46e can be disposed on a same side of respective seams 42a-42e as carcass centerline $CL_C$. Inflation passages 52 are formed by and extend between seams 42a-42e. Inflation passages 52 are disposed between the layers of carcass 38. Length $L_C$ extends across (from left to right in FIGS. 2 and 3) a length of carcass 38 in a direction approximately perpendicular to manifold centerline $CL_M$.

Pneumatic de-icing systems and functioning thereof are described in U.S. Pat. No. 6,520,452 to Crist et al. entitled "Deicer for Aircraft" issued Feb. 18, 2003 and in U.S. Pat. No. 5,337,978 to Fahrner et al. entitled "Leading Edge Pneumatic De-icer Assembly" issued Aug. 16, 1994, both of which are incorporated herein by reference in their entireties.

During operation of aircraft 10 in icing conditions, passages 52 of de-icer 36 are subjected to inflation and deflation during de-icing cycles of de-icer 36. As de-icer 36 performs de-icing cycles, the inflation and deflation of passages 52 causes fatigue in the layers of carcass 38. During normal operation of de-icer 36, second stitchlines 44a-44f distribute the stress along seams 42a-42e, respectively across two stitchline lines instead of just one. This effectively reduces the amount of stress experienced per stitch by 50% as compared to a configuration with only a single stitchline.

During failure events of de-icer 36, such as internal breakage of first stitchlines 42a-42e or second stitchlines 44a-44f or rupturing of the layers of carcass 38, first reinforcement stitchlines 48a-48e and second reinforcement stitchline 50c function to stop a stitchline break (of an adjacent seam stitchline) from propagating beyond the start (or end) of the reinforcement stitchline. Additionally, in the event of a rupture or tear of one of the layers of carcass 38, first reinforcement stitchlines 48a-48e and second reinforcement stitchline 50c act as a termination point for the rupture or tear thereby limiting the size/extent of the rupture and containing the rupture such that the rupture or tear does not extend beyond reinforcement stitchlines 48a-48e and second reinforcement stitchline 50c.

De-icing assembly 30 with de-icer 36 minimizes the initiation of stitchline breakage (with the double stitchline configuration of first stitchlines 42a-42e and second stitchlines 44a-44f), minimizes the propagation rate of a stitchline break should a stitchline break occur (with the double stitchline configuration of first stitchlines 42a-42e and second stitchlines 44a-44f), stops the propagation of a stitchline break (with first reinforcement stitchlines 48a-48e and second reinforcement stitchline 50c located at manifold 32), and stops the propagation of a rupture (with first reinforcement stitchlines 48a-48e and second reinforcement stitchline 50c located at manifold 32) of carcass 38 should a rupture of carcass 38 occur. De-icing assembly 30 with de-icer 36 is particularly useful in aircraft requiring heavy (or high) de-icing utilization rates which place increased fatigue on the carcass of the pneumatic de-icer.

FIG. 4 shows a perspective view of de-icer 36 in a distended (e.g., inflated) condition and includes horizontal stabilizer 14, carcass 38, carcass centerline $CL_C$, seams 42a-42e, first stitchlines 44a-44e, second stitchlines 46a-46e, first reinforcement stitchlines 48a-48e, second reinforcement stitchline 50c, inflation passages 52, first layer 54 of carcass 38, second layer 56 of carcass 38, ice 58, and tensile stresses 60. Manifold 32 is omitted from FIG. 4 for clarity.

The view of FIG. 4 shows carcass 38 in a distended, or inflated, state illustrating breakage of ice as well as the stress experienced by first and second layers 54 and 56 of carcass 38. As carcass 38 is inflated, first layer 54 pulls away from second layer 56 forming a curved shape. As first layer 54 pulls away from second layer 56, stress is placed on both first layer 54 and on second layer 56 in the form of tensile stress 60 and other forms of stress such as hoop stress. Tensile stress 60 and other forms of stress experienced by both first and second layers 54 and 56 of carcass 38 can lead to failure events such as those described with reference to FIGS. 2 and 3.

FIG. 4 further shows how first stitchlines 42a-42e, second stitchlines 44a-44f, first reinforcement stitchlines 48a-48e, and second reinforcement stitchline 50c help to distribute the stresses experience by de-icer 36 (such as tensile stresses 60) across multiple stitchlines helping to minimize the initiation of stitchline breakage, minimize the propagation rate of a stitchline break, stop the propagation of a stitchline break, and stop the propagation of a rupture of either first layer 54 or second layer 56 of carcass 38.

DISCUSSION OF POSSIBLE EMBODIMENTS

The following are non-exclusive descriptions of possible embodiments of the present invention.

A de-icing assembly for a surface of an aircraft includes a carcass, seams, inflation passages, a manifold, and a reinforcement stitchline. The carcass includes a first layer, a second layer, and a carcass centerline. The seams are sewn into the carcass and join the first and second layers of the carcass together. The inflation passages are formed by the seams and are disposed between the first and second layers of the carcass. The manifold includes a width and a manifold centerline oriented approximately perpendicular to the carcass centerline and is fluidly connected to and is disposed beneath the carcass. The first reinforcement stitchline is sewn into the carcass adjacent to one of the plurality of seams and is disposed at a location on the carcass overlapping with the manifold. The first reinforcement stitchline is disposed approximately perpendicular to the manifold centerline and extends across the width of the manifold.

The de-icing assembly of the preceding paragraph can optionally include, additionally and/or alternatively, any one or more of the following features, configurations and/or additional components.

Each seam of the plurality of seams can comprise at least two stitchlines.

The stitchlines of each seam can span the length of the carcass.

A length of the first reinforcement stitchline can be greater than the width of the manifold.

A second reinforcement stitchline can be sewn into the carcass adjacent to one of the plurality of seams, wherein the second reinforcement stitchline can be disposed at a location on the carcass overlapping with the manifold and wherein the second reinforcement stitchline can be disposed approximately perpendicular to the manifold centerline and can extend across the width of the manifold.

A length of the second reinforcement stitchline can be greater than the width of the manifold.

The second reinforcement stitchline can be disposed adjacent to a seam disposed collinear with the carcass centerline.

An aircraft includes an airfoil with a surface and a de-icing assembly mounted to the surface of the airfoil. The de-icing assembly includes a carcass, seams, inflation passages, a manifold, a first reinforcement stitchline, and a second reinforcement stitchline. The carcass includes a first layer, a second layer, and a carcass centerline. The seams are sewn into the carcass and join the first and second layers of the carcass together. The inflation passages are formed by the seams and are disposed between the first and second layers of the carcass. The manifold includes a width and a manifold centerline oriented approximately perpendicular to the carcass centerline and is fluidly connected to and is disposed beneath the carcass. The first reinforcement stitchline is sewn into the carcass adjacent to one of the plurality of seams and is disposed at a location on the carcass overlapping with the manifold. The first reinforcement stitchline is disposed approximately perpendicular to the manifold centerline and extends across the width of the manifold.

The aircraft of the preceding paragraph can optionally include, additionally and/or alternatively, any one or more of the following features, configurations and/or additional components.

The first reinforcement stitchline can be disposed on an opposite side of one of the seams from the carcass centerline.

The first reinforcement stitchline can be centered with the manifold centerline, and wherein a length of the first reinforcement stitchline can be greater than the width of the manifold.

The length of the first reinforcement stitchline can be approximately 6 inches (15.2 centimeters).

The second reinforcement stitchline can be disposed on an opposite side of one of the seams from the carcass centerline.

The second reinforcement stitchline can be centered with the manifold centerline, and wherein a length of the second reinforcement stitchline can be greater than the width of the manifold.

The length of the second reinforcement stitchline can be approximately 6 inches (15.2 centimeters).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, torsional, tensile, compressive, or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

The invention claimed is:

1. A de-icing assembly for a surface of an aircraft, the de-icing assembly comprising:
   a carcass with a first layer, a second layer, and a carcass centerline;
   a plurality of seams sewn into the carcass, wherein the plurality of seams join the first and second layers of the carcass together;
   a plurality of inflation passages formed by the plurality of seams and disposed between the first and second layers of the carcass;
   a manifold fluidly connected to and disposed beneath the carcass, the manifold comprising a width and a manifold centerline oriented approximately perpendicular to the carcass centerline; and
   a first reinforcement stitchline sewn into the carcass adjacent to one of the plurality of seams, wherein the first reinforcement stitchline is disposed at a location on the carcass overlapping with the manifold and wherein the first reinforcement stitchline is disposed approximately perpendicular to the manifold centerline and extends across the width of the manifold.

2. The de-icing assembly of claim 1, wherein each seam of the plurality of seams comprises at least two stitchlines.

3. The de-icing assembly of claim 2, wherein the stitchlines of each seam spans the length of the carcass.

4. The de-icing assembly of claim 1, wherein a length of the first reinforcement stitchline is greater than the width of the manifold.

5. The de-icing assembly of claim 1 further comprising a second reinforcement stitchline sewn into the carcass adjacent to one of the plurality of seams, wherein the second reinforcement stitchline is disposed at a location on the carcass overlapping with the manifold and wherein the second reinforcement stitchline is disposed approximately perpendicular to the manifold centerline and extends across the width of the manifold.

6. The de-icing assembly of claim 5, wherein a length of the second reinforcement stitchline is greater than the width of the manifold.

7. The de-icing assembly of claim 5, wherein the second reinforcement stitchline is disposed adjacent to a seam that is disposed collinear with the carcass centerline.

8. An aircraft comprising:
   an airfoil with a surface;
   a de-icing assembly mounted to the surface of the airfoil, wherein the de-icing assembly comprises:
      a carcass with a first layer, a second layer, and a carcass centerline;
      a plurality of seams sewn into the carcass, wherein the plurality of seams join the first and second layers of the carcass together, wherein each seam of the plurality of seams comprises at least two stitchlines;
      a plurality of inflation passages formed by the plurality of seams and disposed between the first and second layers of the carcass;
      a manifold fluidly connected to and disposed beneath the carcass, the manifold comprising a width and a manifold centerline oriented approximately perpendicular to the carcass centerline;
      a first reinforcement stitchline sewn into the carcass adjacent to one of the plurality of seams, wherein the first reinforcement stitchline is disposed at a location on the carcass overlapping with the manifold and wherein the first reinforcement stitchline is disposed approximately perpendicular to the manifold centerline and extends across the width of the manifold; and
      a second reinforcement stitchline sewn into the carcass adjacent to one of the plurality of seams, wherein the second reinforcement stitchline is disposed at a location on the carcass overlapping with the manifold and wherein the second reinforcement stitchline is disposed approximately perpendicular to the manifold centerline and extends across the width of the manifold.

9. The aircraft of claim 8, wherein the first reinforcement stitchline is disposed on an opposite side of one of the seams from the carcass centerline.

10. The aircraft of claim 8, wherein the first reinforcement stitchline is centered with the manifold centerline, and wherein a length of the first reinforcement stitchline is greater than the width of the manifold.

11. The aircraft of claim 10, wherein the length of the first reinforcement stitchline is approximately 6 inches (15.2 centimeters).

12. The aircraft of claim 8, wherein the second reinforcement stitchline is disposed on an opposite side of one of the seams from the carcass centerline.

13. The aircraft of claim 8, wherein the second reinforcement stitchline is centered with the manifold centerline, and wherein a length of the second reinforcement stitchline is greater than the width of the manifold.

14. The aircraft of claim 13, wherein the length of the second reinforcement stitchline is approximately 6 inches (15.2 centimeters).

* * * * *